United States Patent [19]

Kafka

[11] Patent Number: 5,641,214
[45] Date of Patent: Jun. 24, 1997

[54] ALUMINUM STUDS FOR SNOWMOBILE TRACK

[76] Inventor: Glenn E. Kafka, C3813 Maryel Dr., Stratford, Wis. 54484

[21] Appl. No.: 399,760

[22] Filed: Mar. 7, 1995

[51] Int. Cl.⁶ .................................................. B62D 55/28
[52] U.S. Cl. .......................................... 305/180; 305/192
[58] Field of Search ......................... 305/24, 35 R, 305/35 EB, 39, 54, 180, 187, 191, 192

[56] References Cited

U.S. PATENT DOCUMENTS

| | | | |
|---|---|---|---|
| 3,838,894 | 10/1974 | Reedy | 305/54 X |
| 4,474,414 | 10/1984 | Tokue | 305/35 EB |
| 4,758,055 | 7/1988 | Anderson | 305/54 X |
| 5,188,441 | 2/1993 | Rubel | 305/54 |
| 5,234,266 | 8/1993 | Musselman et al. | 305/54 |
| 5,284,386 | 2/1994 | Rubel | 305/54 |

OTHER PUBLICATIONS

Roetin Industries Traction Control System Catalogue, 1994.
Woody's Traction and Control Products Catalogue, Winter 1994.
Saber Traction Products Catalogue 1995.
Woody's Traction and Control Products Brochure, Copyrighted 1994.
Saber Traction Products, 1994 Catalog.

Primary Examiner—Russell D. Stormer
Attorney, Agent, or Firm—Andrus, Sceales, Starke & Sawall

[57] ABSTRACT

Improved snowmobile acceleration and higher snowmobile top speeds can be obtained using a studded snowmobile belt track with lightweight studs preferably made of aluminum. Higher snowmobile top speeds and improved snowmobile acceleration are accomplished because aluminum studs weigh as much as 66 percent less than conventional steel studs. The aluminum studs can be push-through type studs with or without a spade face, or T-nut type studs with or without a spade face. Spade faces on the push-through studs are preferably tapered at 5° in relation to a longitudinal axis of the stud. Push-through type studs preferably have a grip ridge that projects from the head of the stud into the snowmobile belt to prevent bulging of the belt near the stud.

21 Claims, 4 Drawing Sheets

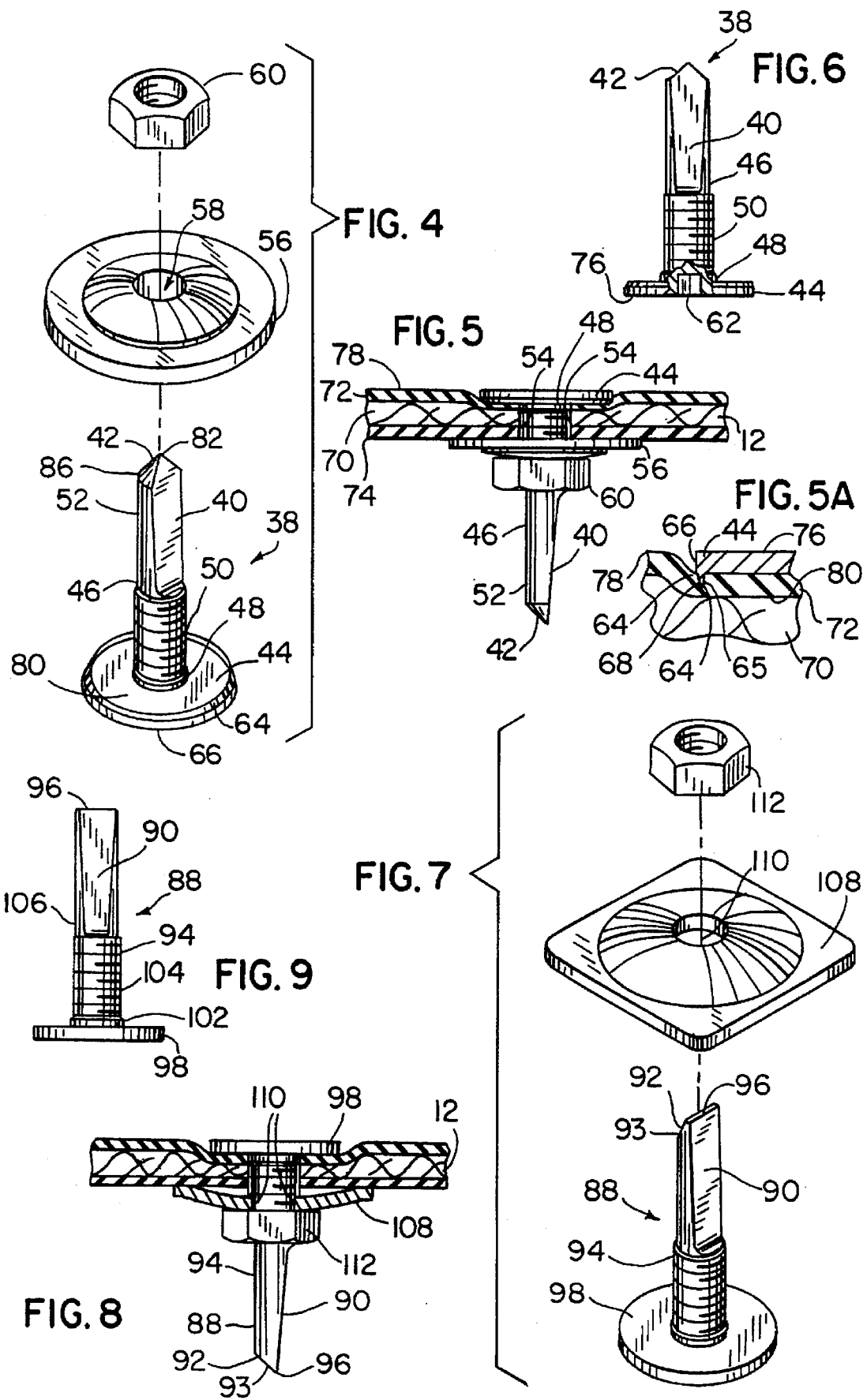

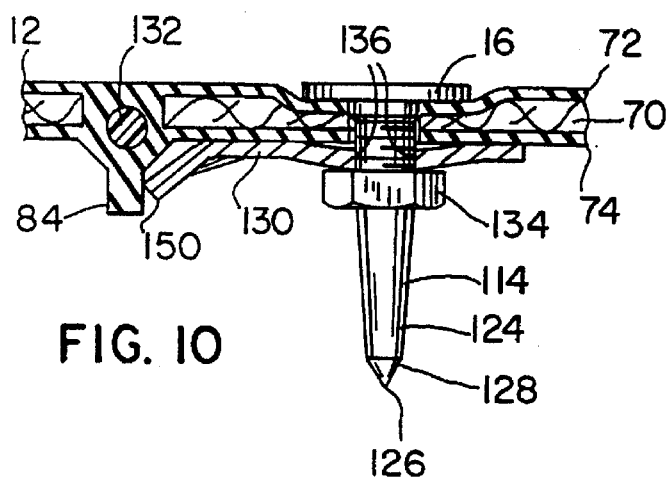
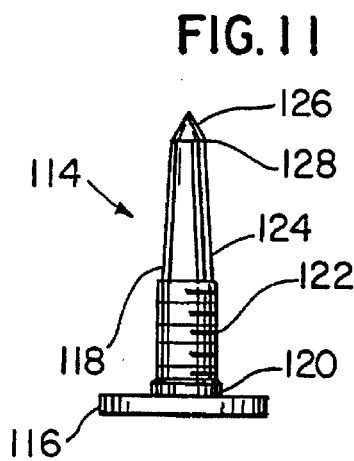
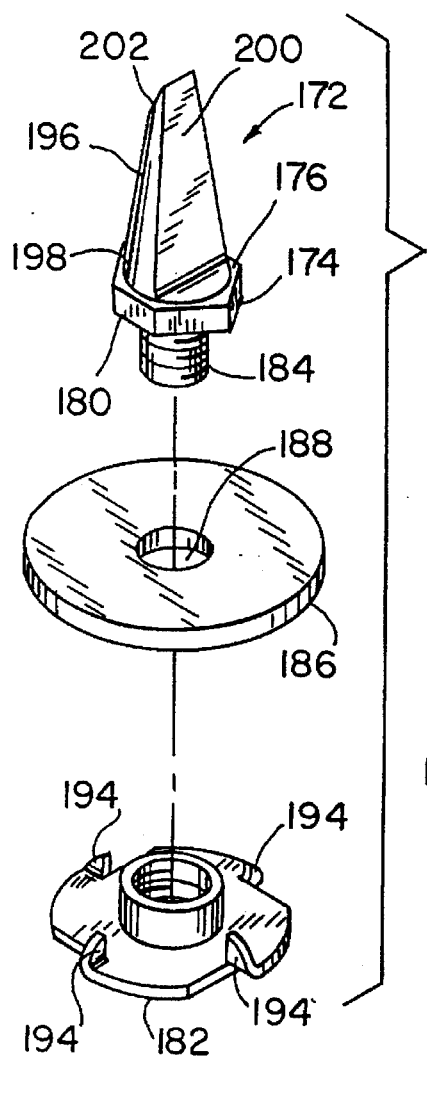
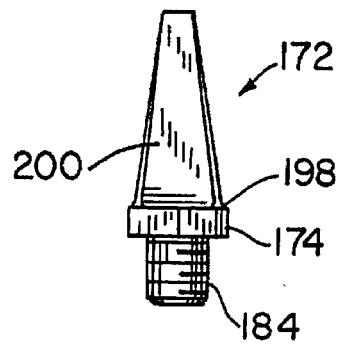
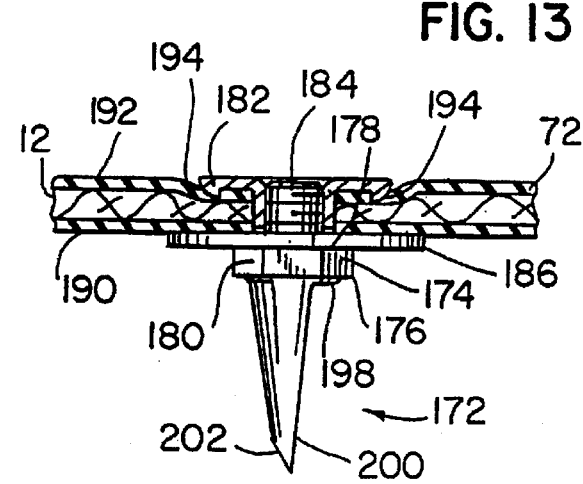

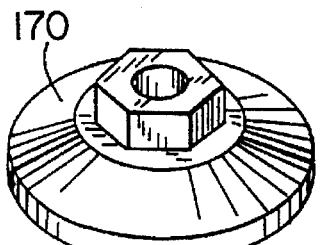
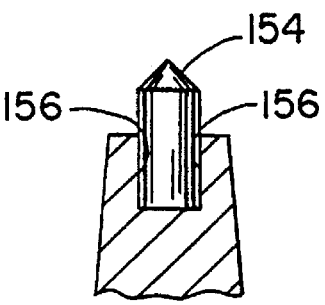
FIG. 16
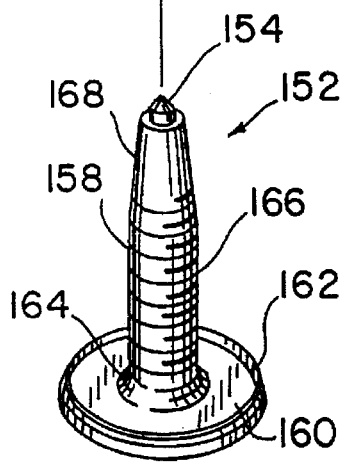
FIG. 15
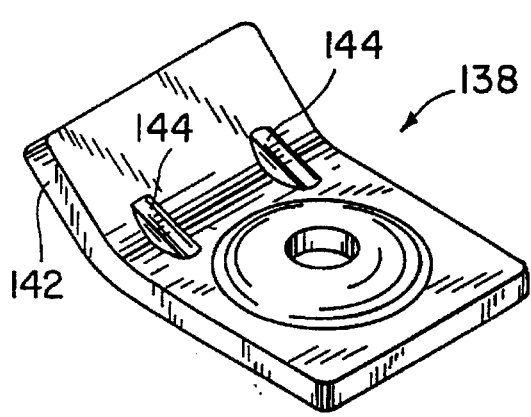
FIG. 17
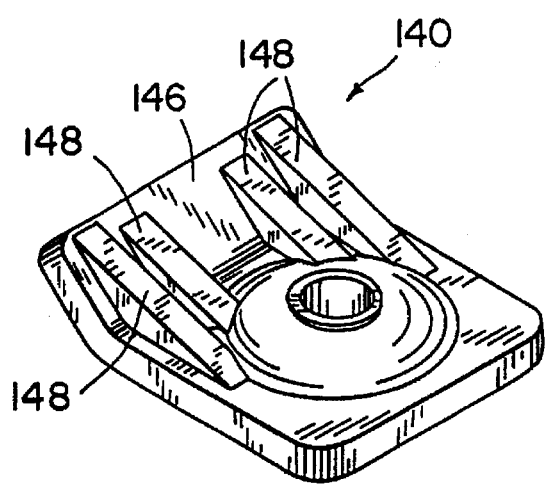
FIG. 18

ALUMINUM STUDS FOR SNOWMOBILE TRACK

BACKGROUND AND SUMMARY OF THE INVENTION

The invention relates to aluminum studs for snowmobile belt tracks. The invention is particularly useful for grass drag snowmobile racing, and can also be used for ice and snow snowmobile racing and high speed recreational snowmobiling.

Snowmobiles are normally propelled by a resilient belt track driven by sprocket drive wheels. Conventional belt tracks have transverse lugs for traction. To improve traction, it is well known to mount studs in the belting of the belt track between the transverse lugs. Snowmobile studs are typically made of hardened carbon steel. Hardened carbon steel has been used because of its durability. Most studs for ice tracks have a conical, ice-penetrating shank made of hardened steel with an ice-penetrating point. These studs are commonly referred to as picks. Studs for grass drag racing, or soft ice and hard packed snow conditions, are commonly referred to as spades or chisels. Spades or chisels have a flat rear face that is useful for gripping dirt, snow or ice.

There are generally two types of studs: push-through type studs and T-nut type studs. With a push-through stud, a shank of a stud projects perpendicularly from a head of the stud, and the shank is pushed through the belt track from the inside of the belt track. A backer plate or washer are then tightened onto threads on the shank from the outside of the belt with a nut. T-nut studs do not have a head, but have a transverse flange from which a penetration shank projects from a first side and threads project from the other side. To mount T-nut studs, the threads of the stud are passed through a backer plate or washer and through the belt track from the outside of the belt track, and a T-nut is tightened onto the stud threads from the inside of the belt track.

Heretofore, virtually all studs have been made of hardened carbon steel to withstand impact against dirt, ice or snow. Some steel studs even have a hardened carbide insert with a conical ice penetrating tip. Steel studs are durable and improve traction, but steel studs, along with the backer plates and the nuts, add weight to the belt track.

As the weight of the belt track increases, acceleration of the snowmobile is limited and the maximum top speed of the snowmobile is slower. It is therefore desirable to provide lightweight snowmobile studs having sufficient strength and durability.

The invention provides lightweight snowmobile studs, preferably made of aluminum, that have sufficient strength and durability for snowmobile racing on ice, snow or dirt, and for recreational snowmobiling on snowmobile trails. Aluminum studs weigh about 66 percent less than conventional steel studs (e.g. an aluminum stud can weigh about 3 to 4 grams, whereas a comparable steel stud can weigh 10 to 12 grams).

BRIEF DESCRIPTION OF THE DRAWINGS

FIG. 4 is an exploded perspective view of a lightweight push-through type stud assembly having a stud, with a spade face as in accordance with the invention;

FIG. 5 is an assembly view of the push-through type stud assembly shown in FIG. 4 mounted to a snowmobile belt track in accordance with the invention;

FIG. 5a is a detailed view showing a grip ridge on a head of the push-through type stud of FIG. 5;

FIG. 6 is a side elevational view having parts broken away of the push-through type stud shown in FIGS. 4 and 5;

FIG. 7 is an exploded perspective view of a lightweight push-through type stud assembly similar to that shown in FIG. 4, wherein the stud has a chisel tip in accordance with the invention;

FIG. 8 is an assembly view of the stud assembly shown in FIG. 7 mounted to a snowmobile belt track in accordance with the invention;

FIG. 9 is an elevational view of the push-through type shown in FIGS. 7 and 8;

FIG. 10 is an assembly view showing a lightweight ice-pick type of snowmobile stud assembly mounted to a snowmobile belt track in accordance with the invention;

FIG. 11 is an elevational view of the ice-pick type snowmobile stud shown in FIG. 10;

FIG. 12 is an exploded perspective view of a lightweight T-nut type of snowmobile stud assembly in accordance with the invention;

FIG. 13 is an assembly view of a T-nut type snowmobile stud assembly mounted to a snowmobile belt track in accordance with the invention;

FIG. 14 is a side elevational view of the T-nut type snowmobile stud shown in FIGS. 12 and 13;

FIG. 15 is an exploded perspective view of a lightweight ice-pick type snowmobile stud having a hardened tip insert in accordance with the invention;

FIG. 16 is a detailed view of the hardened tip insert shown in FIG. 15;

FIG. 17 is a detail view of another backer plate than can be used in accordance with the invention; and FIG. 18 is a detail view of yet another backer plate that can be used in accordance with the invention.

DETAILED DESCRIPTION OF THE PREFERRED EMBODIMENTS

Figure 1:
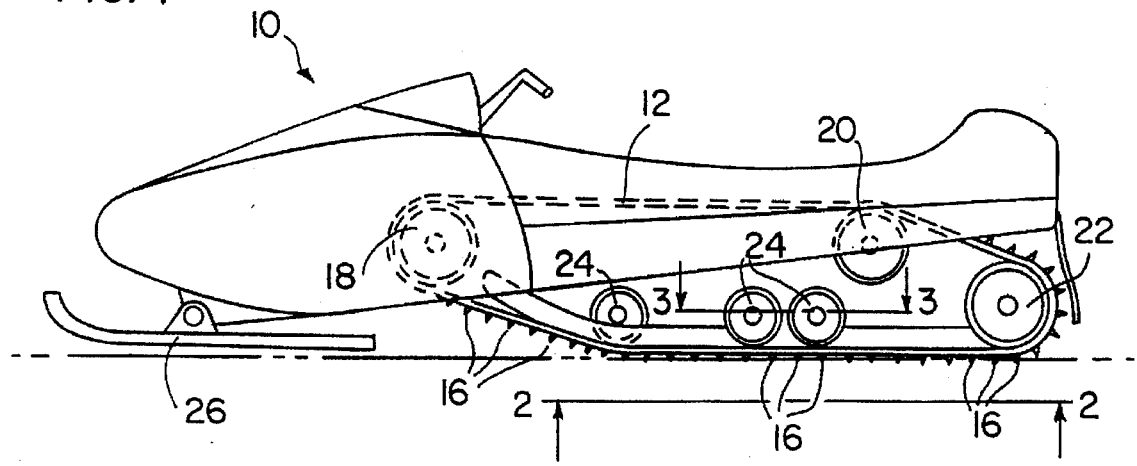
FIG. 1 is a schematic drawing of a snowmobile having a studded belt track for propulsion.

FIG. 1 shows a snowmobile 10 that is propelled by an endless resilient snowmobile belt track 12. A pair of sprocket drive wheels 18 drive the resilient belt track 12. The belt track 12 entrains idler wheels 20 and 22 and bogey wheels 24. The snowmobile 10 is suspended on the bogey wheels 24, and front skis 26.

In accordance with the invention, the belt track 12 has aluminum studs 16 to improve traction. The aluminum studs 16 weigh up to 66 percent less than comparable studs made of hardened carbon steel. The lightweight studded snowmobile belt track 12 improves snowmobile acceleration, but more importantly increases the maximum travel speed of the snowmobile 10 as compared to snowmobiles having belt tracks with heavier steel studs. This is particularly useful for snowmobile racers that are competing in radar races, speed running, or any other kind of races in which top end speed is important such as drag racing or cross-country racing.

Figure 2:
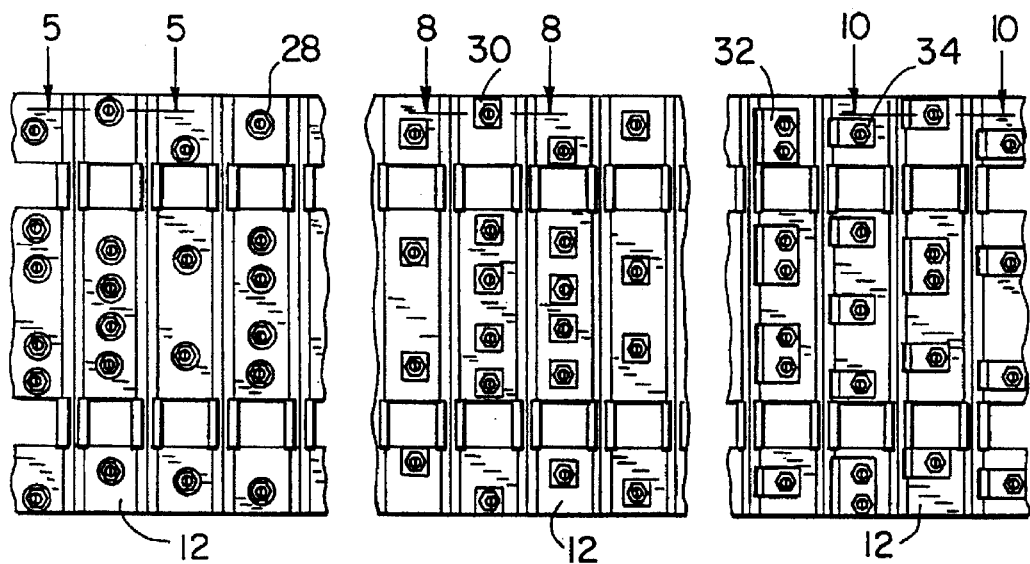
FIG. 2 is a fragmented bottom view taken along line 2—2 in FIG. 1 of a studded snowmobile belt track.
Figure 3:
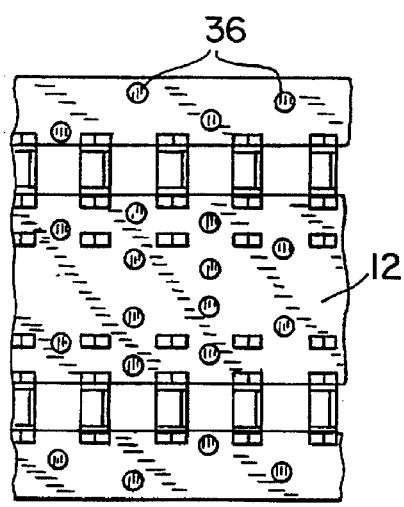
FIG. 3 is an inside view taken along line 3—3 in FIG. 1 of a studded snowmobile belt track.

Referring to FIG. 2, the aluminum studs 16 can be mounted through the snowmobile belt track 12 in various patterns. In order to provide stability to the studs 16 during operation, it is important to use washers or backer plates such as washers 28 and 30, and backer plates 32 and 34. Backer plate 32 is a double backer plate. It is preferred that washers 28 or 30, and backer plates 32 or 34, be made of plastic or aluminum because these materials are lightweight. FIG. 3 shows heads 36 of push-through type studs as mounted for operation and viewed from the inside of the belt track 12.

FIGS. 4–11 and FIGS. 15 and 16 show aluminum push-through studs and stud assemblies in accordance with the invention. Referring in particular to FIGS. 4–6, one embodiment of the invention is a lightweight push-through stud assembly, having a stud 38 with a spade face 40 and an arrowhead tip 42. The stud 38 shown in FIGS. 4–6 has a generally flat circular head 44. The stud 38 also has an elongated shank 46 that projects perpendicularly from the head 44. The head 44 and the shank 46 are made out of the same material, preferably aluminum, and the head 44 and the shank 46 are integral with one another. The studs 38 can be produced in high volumes from aluminum bar stock in a screw machine or other similar process.

The elongated shank 46 is generally cylindrical, except for the spade face 40 and the arrowhead tip 42. The elongated shank 46 preferably has a base portion 48 adjacent the head 44, a cylindrical threaded portion 50 extending along the shank 46 beyond the base portion 48, and a penetration portion 52 having a spade face 40 and a penetration tip 42.

The length of the elongated shank 46 from the inside surface 80 of the head 44 to the point 82 of the arrowhead tip 42 is preferably about 1¼ inches (i.e. 1.35 inches to 1.15 inches). Under most snowmobile racing regulations, the length of the stud is normally limited in terms of a distance beyond the end of transverse rubber lugs 84 (see FIG. 10) of the belt track 12. In any event, if the stud shank 46 is too long, the studs 38 will tend to bend or break easier. Also, if the studs 38 are too long, it is probable that the studs 38 will damage the snowmobile 10 unless the clearance for the belt track 12 is adjusted.

The base portion 48 of the stud 38 is preferably 0.14 inches long, with a diameter of 0.315 inches. The cylindrical threaded portion 50 of the stud 38 is preferably 0.480 inches long with a 0.25 inch 28 fine thread. The core diameter of the threads 50 is preferably 0.2431 inches or larger, and should be no less than 0.2000 inches.

The preferred length of the penetration portion 52 of the stud 38 is 0.7 inches. The penetration portion 52 has a cylindrical cross-section except for the spade face 40. The arrowhead tip 42 of the penetration portion 52 slants at a preferred angle of 30° from the contour line 86 to the stud point 82. The spade face 40 intersects the center line or longitudinal axis of the stud shank 46 at the stud point 82. The flat spade face 40 extends substantially the entire length of the penetration portion 52. The flat spade face 40 is preferably tapered at a straight angle of approximately 5° in relation to the longitudinal axis of the stud shank 46. The flat spade face 40 is useful for gripping dirt or snow to improve traction in soft conditions, and the preferred 5° taper does not substantially effect the gripping performance of the spade 40. However, the preferred 5° taper increases the strength of penetration portion 52 in the region towards the cylindrical threaded portion 50.

The push-through stud 38 can be mounted through a hole 54 in the belt track 12. To do so, the elongated shank 46 is pushed through the hole 54 in the belt 12 from the inside of the belt 12. A washer or backer plate 56 is placed over the stud 38 from the outside of the belt 12 by placing the shank 46 of the stud 38 through hole 58 in the washer 56. A self-locking hex nut 60 is tightened onto the threads 50 of the stud 38.

The head 44 has a socket recess 62 so that a socket wrench can be used to tighten the self-locking nut 60 onto the threads 50 of the stud 38. It is preferred that the socket recess 62 be centered along a longitudinal axis of the stud 38, and have a depth of about 0.09 inches.

The head 44 also has a grip ridge 64 projecting from the head 44 substantially parallel to the elongated shank 46. The grip ridge 64 projects from the circumferential edge 66 of the head 44. The grip ridge 64 has an inside surface 65 that preferably extends perpendicularly from an inside surface 80 of the head 44 to a grip ridge tip 64. The length of the grip ridge 64 from the inside surface 80 of the head 44 to the grip ridge tip 64 is preferably about 1/16 of an inch. The grip ridge 64 has an outside surface 68 that preferably slants from the outer edge 66 of the head 44 to the grip ridge tip 64.

The grip ridge 64 can improve the quality of the mount of the stud 38 to the belt 12, especially when the self-locking nut 60 is tightened very tight. The belt 12 normally has a middle layer of fabric 70 sandwiched between an inside layer 72 of rubber and an outside layer 74 of rubber. As the nut 60 is tightened onto the threads 50 of the stud 38, the head 44 of the stud 38 squeezes the inside layer 72 of rubber towards the nut 60 and the washer 56. The washer 56 (or backer plate) does not substantially squeeze the outside layer 74 of rubber towards the head 44 because the surface area of the washer 56 (or backer plate) is substantially greater than the surface area of the head 44. The grip ridge 64 penetrates into the inside layer of rubber 72 and helps prevent the inside layer 72 from bulging beyond the head 44 as the nut 60 is tightened. The nut 60 should be tightened enough so that the surface 76 of the head 44 is substantially flush with the inside surface 78 of the inside layer 72 of rubber.

When the push-through stud 38 is made of aluminum, the thickness of the head 44 (i.e. the distance between surface 80 and surface 76) should be no less than 0.07 inches in order to provide sufficient strength for the stud 38. The preferred thickness of the head 44 between the flat surfaces 76 and 80 is 0.08 inches. The head thickness for the aluminum push-through stud 38 should, in general, be greater than the thickness of heads for steel push-through studs. Because of the thicker heads 44, an aluminum stud 38 without the grip ridge 64 may have more tendency to bulge the inside layer 74 of rubber when the nut 60 is tightened to make the surface 76 of the head 44 flush with the inside surface 78 of the inside layer 74 of rubber.

FIGS. 7–9 show a push-through type stud assembly in which a push-through stud 88 has a spade face 90 and a chisel-shaped tip 92, in contrast to the arrowhead tip 42 shown in FIGS. 4–6. The chisel-shaped tip 92 shown in FIGS. 7–9 is useful in soft dirt or snow conditions because of the additional surface area of the spade face 90. The arrowhead tip 92 shown in FIGS. 4–6, may be more appropriate in harder conditions, because the arrowhead tip 42 aids in penetration.

The chisel-type stud 88 shown in FIGS. 7–9 has a head 98 and an elongated shank 44 that projects perpendicularly from the head 98 and is integral therewith. The head 98 does not show a grip ridge such as grip ridge 64 shown in FIGS. 4–6, however, the head 98 of the stud 88 may have a grip ridge. The elongated shank 44 of stud 88 has a base portion 102, a cylindrical threaded portion 104, and a penetration portion 106 with a chisel tip 92.

The chisel-shaped tip 92 preferably has a chisel surface 93 that forms a 30° angle with the longitudinal axis of the elongate shank 94. A penetrating edge 96 is formed between the chisel surface 93 and the spade face 90. The penetrating edge 96 could be sharp, but it is preferred that the edge 96 be flattened and have a minimum width of 0.025 inches.

Referring to FIG. 7, a square washer 108 with a center hole 110 is shown with the stud 88 and a self-locking nut 112. Referring to FIG. 8, the stud 88 is mounted to the belt 12 by pushing the elongated shank 94 of the stud 88 through a hole in the belt 12, by placing the washer 108 over the elongated shank 94 via hole 110, and by tightening with the nut 112.

In other respects, the preferred dimensions of the push-through, chisel-type stud 88 shown in FIGS. 7–9 are preferably substantially the same as the dimensions of the push-through type arrowhead type stud 38 shown in FIGS. 4–6.

FIGS. 10 and 11 show another embodiment of an aluminum, push-through stud 114 in accordance with the invention. The stud 114 shown in FIGS. 10 and 11 is an ice pick type stud assembly that is useful for ice track racing, or other hard conditions. The ice pick type stud 114 has a head 116 and an elongated shank 118 that projects perpendicularly from the head 116 and is integral therewith. The head 116 can be substantially the same as the head 98 shown and described in conjunction with FIGS. 7–9, or the head 44 with grip ridge 64 shown and described in conjunction with FIGS. 4–6. The elongated shank 118 has a base portion 120, a cylindrical threaded portion 122, and a penetration portion 124 with an arrowhead tip 126. The penetration portion 124 of the elongated shank 118 does not have a spade face. Rather, the penetration portion 124 and the arrowhead tip 126 are designed to facilitate penetration into a hard surface, and to maximize the strength of the penetration portion 124. It is preferred that the body of the penetration portion 124 taper inwards at a 3° angle as the penetration portion 124 extends away from the cylindrical threads 122 to the contour line 128 which defines the beginning of the arrowhead tip 126. Note that the arrowhead portion 126 is sharper than the arrowhead portion 42 of stud 38 shown in FIGS. 4–6.

FIG. 10 shows the ice pick stud 114 mounted to a snowmobile belt 12. The stud 114 is pushed through a hole in the belt 12 and through a hole 136 in a backer plate 130. A self-locking nut 134 is used to tighten the backer plate 130 and the stud 114 to the belt 12.

FIG. 17 shows an aluminum backer plate suitable for mounting the stud 114. FIG. 18 shows a plastic backer plate 140 suitable for mounting the stud 114. Aluminum backer plates are supplied by the Woody's Co., Houghton, Mich. For dirt tracks, plastic backers should be used, and these can be purchased by Chopper City Sports in Fridley, Minn. The aluminum backer plate 138 has a supporting flange 142 and strength braces 134 to support the flange 142. The plastic backer plate 144 has a supporting flange 146 and supporting braces 148 to support the flange 146. The plastic backer plate 140 has more supporting braces 148 than the aluminum backer plate 138, and the supporting braces 148 are larger.

Referring again to FIG. 10, a supporting flange 150 of the backer plate 130 abuts against transverse lug 84 of the belt 12. Transverse rubber lug 84 projects downward from the belt 12 from a location in the belt 12 through which a transverse fiberglass grouser bar 132 is located. By using the backer plate 130, the support flange 150 supports against the lug 84, and the stud 114 is more stable when mounted to the belt 112.

FIGS. 15 and 16 show another push-through type aluminum stud 152 in accordance with the invention. The stud 152 shown in FIGS. 15 and 16 has a hardened carbide penetration tip 154 inserted in a cavity 156 of the elongated shank 158. The hardened carbide tip insert 154 is especially useful for improving the life of the stud 152 when the snowmobile 10 is used over trails. The stud 152 preferably has a head 160 that may or may not have the grip ridge 162 and an elongated shank 158 that projects perpendicularly from the head 160 and is integral therewith. The elongated shank 158 preferably has a base portion 164, a cylindrical threaded portion 166, and a conical penetration portion 168 with a hardened carbide tip insert 154. The carbide tip 154 can be fixed into the cylindrical cavity 156 by any suitable means, but soldering is preferred. Since it is preferred that the stud 152 be used for recreational snowmobiling over trails, it is preferred that the core diameter of the cylindrical threaded portion be 0.2203 and should be no less than 0.2000. It has been found that such a core diameter for an aluminum stud having the configuration of the stud 152 provides the desirable strength to be commensurate with the use of the carbide tip 154.

FIG. 15 also shows a combined nut and washer 170 that is suitable under some conditions for mounting the stud 152 (or the other push-through studs 38, 88, and 114 shown herein) to a snowmobile belt 12. The combined nut and washer 170 is preferably made of plastic or some other lightweight material.

FIGS. 12–14 show an aluminum, T-nut stud 172 in accordance with the invention. The T-nut stud 172 has a flange 174 that has two generally flat sides 176 and 178. The thickness of the flange 174 between the two flat sides 176 and 178 is preferably ⅛ inch. A peripheral edge 180 of the flange 174 between the two flat sides 176 and 178 is preferably in the shape of a hex nut to facilitate tightening of the stud 172 to a T-nut 182.

The T-nut 172 has a cylindrical threaded portion 184 that projects perpendicularly from the flat side 178 of the flange 174. The length of the cylindrical threaded portion 184 is preferably ⅜ of an inch, and it is necessary for the core diameter of the threads in the cylindrical threaded portion 184 be no less than 0.2 inches. An aluminum T-nut stud 172 having a cylindrical threaded portion 184 with core diameter of less than 0.2 inches will not have sufficient strength, and will tend to bend or break easily.

When mounting the stud 172 to the belt 12, the cylindrical threaded portion 184 of the stud 172 is passed through a hole 188 in a washer or backer plate depicted as washer 186 in FIG. 12, and through a hole in the snowmobile belt 12 from the bottom side 190 of the snowmobile belt 12. The T-nut 182 is tightened onto the threads 184 of the stud 172 from the inside 192 of the snowmobile belt 12. The peripheral edge 180 of the flange 174 which is in the shape of a hex nut, facilitates the use of a wrench to tighten the stud 172 into the T-nut 182. The T-nut 182 preferably has penetrating teeth 194 that penetrate the inside layer of rubber 72 of the snowmobile belt 12 when the stud 172 is tightened, thereby keeping the T-nut 182 from loosening easily during operation.

The T-nut stud 172 has a penetration shank 196 that projects perpendicularly from the side 176 of the flange 174 that is opposite the cylindrical threaded portion 184. The penetration shank 196 has a base portion 198 that is adjacent to and integral with the flange 174. The penetration shank 196 has a generally conical shape (except for a spade face 200 and a chisel surface 202) in which the cross-sectional area of the penetration shank 196 lessens as the shank 196 extends away from the flange 174. It is preferred that the penetration shank 196 taper at a 7° angle towards a longitudinal axis of the stud 172 as the shank 196 extends away from the flange 174. The shank 196 has a spade face 200 that extends substantially the entire length of the shank 196, and faces backwards when the stud 172 is mounted through a bottom side of the snowmobile belt 12. FIG. 13 shows the spade face 200 tapering at approximately 5° relative to the longitudinal axis of the stud 172, however the spade face 200 can also be straight (i.e. a zero degree taper). The conical shape of the shank 196, with a relatively wide base portion 198, improves the strength of the shank 196 while at the same time increasing the surface area of the spade face 200 to improve traction in soft conditions. The T-nut type stud 172 preferably has a chisel surface 202 having a 30° angle to the longitudinal axis of the stud 172.

All of the studs described herein 38, 88, 114, 152, and 172, should be made of hardened aluminum alloys having a yield strength of no less than 50 and a tensile strength of no less than 60. It is preferred that the studs be made of an aluminum alloy such as 7075-T6,T651 which has a tensile strength of 83 and a yield strength of 73, or 7178-T6,T651 which has a tensile strength of 88 and a yield strength of 78.

It should be recognized that various equivalents, alternatives and modifications of the invention are possible and should fall within the scope of the claims. For instance, it should be apparent that the various studs 38, 88, 114, 152, and 172 shown herein can each be mounted using the various washer or backer plates 56, 108, 130, 138, 140, and 186, shown herein.

I claim:

1. A push-through stud for a snowmobile belt track comprising:

a generally flat head; and an elongated shank integral with and projecting from a center of the head, the shank having a penetration portion opposite the head and a cylindrical threaded portion between the head and the penetration portion;

wherein the stud is made of a hardened aluminum alloy having a yield strength of no less than 50 ksi and a tensile strength of no less than 60 ksi.

2. A push-through stud as recited in claim 1 wherein the penetration portion has a flat spade face extending substantially the entire length of the penetration portion and facing backwards when the stud is properly mounted through a bottom side of the belt, the spade face tapering slightly forward as the face extends away from the threaded portion; and wherein the cylindrical threaded portion has a core diameter of at least one fifth of an inch.

3. A push-through stud as recited in claim 2 wherein the spade face tapers forward at approximately 5° in relation to a longitudinal axis of the elongated shank.

4. A push-through stud as recited in claim 2 wherein the penetration portion further has a chisel shaped tip including a chisel surface on the front side of the stud and a flattened edge at the tip of the stud between the spade face and the chisel surface.

5. A push-through stud as recited in claim 4 wherein the flattened edge is at least 0.025 inches thick.

6. A push-through stud as recited in claim 2 wherein the penetration portion further has an arrowhead tip.

7. A push-through stud as recited in claim 1 wherein the penetration portion has an ice pick shape, and cylindrical threaded portion has a core diameter of at least one fifth of an inch.

8. A push-through stud as recited in claim 1 wherein the elongated shank has a base portion between the head and the threaded portion and the length of the threaded portion is at least 0.45 inches.

9. A push-through stud as recited in claim 1 wherein the head has a thickness of at least 0.07 inches.

10. A push-through stud as recited in claim 1 wherein the head on the stud has a grip ridge projecting substantially parallel to the elongated shank and extending around a circumferential edge of the head.

11. A push-through stud as recited in claim 1 wherein a cross-section of the elongated shank is substantially circular along the entire length of the shank, a cylindrical cavity substantially parallel to a longitudinal axis of the elongated shank is located in a tip of the penetration portion, and a hardened carbide penetration tip is inserted in the cavity.

12. A T-nut type stud for a snowmobile belt track comprising:

a flange having two generally flat sides and a thickness;

a cylindrical threaded portion projecting perpendicularly from one of the sides of the flange; and a penetration shank projecting perpendicularly from the other side of the flange;

wherein the stud is made of a hardened aluminum alloy having a yield strength of no less than 50 ksi and a tensile strength of no less than 60 ksi.

13. A T-nut type stud as recited in claim 12 wherein the cylindrical threaded portion has a core diameter greater than 0.1876 inches.

14. A T-nut type stud as recited in claim 12 wherein a cross-sectional area of the penetration shank lessens as the penetration shank extends away from the flange.

15. A T-nut type stud as recited in claim 12 wherein the penetration shank has a flat spade face extending substantially the entire length of the shank and facing backwards when the stud is properly mounted through a bottom side of the belt.

16. A T-nut type stud as recited in claim 15 wherein the spade face tapers forward as the face extends away from the flange at approximately 5° relative to a longitudinal axis of the stud.

17. A T-nut type stud as recited in claim 12 wherein the flange has a peripheral edge between the two flat sides that is in the shape of a hex nut.

18. A push-through stud for a snowmobile belt track comprising:

a generally flat head; and an elongated shank integral with and projecting from a center of the head, the shank having a penetration portion opposite the head and a cylindrical threaded portion between the head and the penetration portion, the cylindrical threaded portion having a core diameter of at least one fifth of an inch, and the penetration portion having a flat spade face extending substantially the entire length of the penetration portion and facing backwards when the stud is properly mounted through a bottom side of the belt, the spade face tapering forward as the face extends away from the threaded portion at approximately 5° in relation to a longitudinal axis of the elongated shank; and wherein the stud is made of aluminum.

19. A push-through stud for a snowmobile belt track comprising:

a generally flat head; and an elongated shank integral with and projecting from a center of the head, the shank having a penetration portion opposite the head and a cylindrical threaded portion between the head and the penetration portion, the cylindrical threaded portion having a core diameter of at least one fifth of an inch, and the penetration portion having a flat spade face extending substantially the entire length of the penetration portion and facing backwards when the stud is properly mounted through a bottom side of the belt, the spade face tapering forward as the face extends away from the threaded portion;

wherein the stud is made of aluminum and wherein the penetration portion further has a chisel-shaped tip including a chisel surface on the front side of the stud and a flattened edge at the tip of the stud between the spade face and the chisel surface.

20. A push-through stud as recited in claim 19 wherein the flattened edge is at least 0.025 inches thick.

21. A T-nut type stud for a snowmobile belt track comprising:

a flange having two generally flat sides and a thickness;

a cylindrical threaded portion projecting perpendicularly from one of the sides of the flange; and a penetration shank projecting perpendicularly from the other side of the flange, the penetration shank having a flat spade face extending substantially the entire length of the shank and facing backwards when the stud is properly mounted through a bottom side of the belt, the spade face tapering forward as the face extends away from the flange at approximately 5° relative to a longitudinal axis of the stud; and wherein the stud is made of aluminum.

\* \* \* \* \*